(12) United States Patent
O'Toole, Jr. et al.

(10) Patent No.: US 7,987,271 B1
(45) Date of Patent: Jul. 26, 2011

(54) METHODS AND APPARATUS FOR INSERTING CONTENT WITHIN A CONTENT PAGE

(75) Inventors: James W. O'Toole, Jr., Somerville, MA (US); James A. Aviani, Santa Barbara, CA (US); Joshua Miles Chase, Santa Barbara, CA (US); James Melvin, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 2727 days.

(21) Appl. No.: 10/217,206

(22) Filed: Aug. 12, 2002

(51) Int. Cl.
*G06F 15/16* (2006.01)
*G06Q 30/00* (2006.01)

(52) U.S. Cl. ...................... 709/227; 705/14.4

(58) Field of Classification Search .......... 709/200, 709/232, 234, 219, 246, 229, 223, 227; 705/14.4
See application file for complete search history.

(56) References Cited

U.S. PATENT DOCUMENTS

| | | | |
|---|---|---|---|
| 5,931,916 A * | 8/1999 | Barker et al. | 709/239 |
| 5,945,989 A | 8/1999 | Freishtat et al. | 345/329 |
| 6,009,410 A * | 12/1999 | LeMole et al. | 705/14.54 |
| 6,094,677 A * | 7/2000 | Capek et al. | 709/219 |
| 6,243,761 B1 * | 6/2001 | Mogul et al. | 709/246 |
| 6,314,451 B1 * | 11/2001 | Landsman et al. | 709/203 |
| 6,453,354 B1 * | 9/2002 | Jiang et al. | 709/229 |
| 6,456,308 B1 * | 9/2002 | Agranat et al. | 715/854 |
| 6,480,895 B1 * | 11/2002 | Gray et al. | 709/231 |
| 6,487,663 B1 * | 11/2002 | Jaisimha et al. | 713/193 |
| 6,490,564 B1 * | 12/2002 | Dodrill et al. | 704/275 |
| 6,523,022 B1 | 2/2003 | Hobbs | 707/3 |
| 6,529,584 B1 * | 3/2003 | Ravago et al. | 379/67.1 |
| 6,636,498 B1 * | 10/2003 | Leung | 370/338 |
| 6,643,621 B1 * | 11/2003 | Dodrill et al. | 704/275 |
| 6,671,807 B1 * | 12/2003 | Jaisimha et al. | 713/193 |
| 6,701,355 B1 | 3/2004 | Brandt et al. | 709/219 |
| 6,738,803 B1 * | 5/2004 | Dodrill et al. | 709/218 |
| 6,766,298 B1 * | 7/2004 | Dodrill et al. | 704/270.1 |
| 6,769,028 B1 * | 7/2004 | Sass et al. | 709/231 |
| 6,826,594 B1 * | 11/2004 | Pettersen | 709/203 |
| 6,950,623 B2 * | 9/2005 | Brown et al. | 455/3.01 |
| 6,976,085 B1 * | 12/2005 | Aviani et al. | 709/234 |
| 7,006,975 B1 * | 2/2006 | Dodrill et al. | 704/275 |
| 7,054,917 B1 * | 5/2006 | Kirsch et al. | 709/217 |
| 7,089,330 B1 * | 8/2006 | Mason | 709/246 |
| 7,546,486 B2 * | 6/2009 | Slik et al. | 714/15 |
| 2002/0002488 A1 * | 1/2002 | Muyres et al. | 705/14 |
| 2002/0103925 A1 * | 8/2002 | Sheth et al. | 709/236 |

* cited by examiner

*Primary Examiner* — Wing F Chan
*Assistant Examiner* — Alicia Baturay
(74) *Attorney, Agent, or Firm* — Patterson & Sheridan, LLP

(57) ABSTRACT

Mechanisms and techniques provide a data communications device for inserting an audio tag into a content page during a communications session between a first computerized device and a second computerized device. A data communications device receives a request for a content page from a first computerized device and transfers the request to a second computerized device. The data communications device receives the content page from the second computerized device in response to the request, inserts an audio tag within the content page, and adjusts a connection characteristic associated with the content page to maintain the communications session between the first computerized device and the second computerized device. The data communications device then transfers the content page having the inserted audio tag and modified connection characteristic to the first computerized device.

21 Claims, 7 Drawing Sheets

METHODS AND APPARATUS FOR INSERTING CONTENT WITHIN A CONTENT PAGE

BACKGROUND OF THE INVENTION

Advertisements are an important means for generating revenue for Web sites on the Internet. Typically, Web site operators allow advertisers to place advertisements on their Web sites for a fee, thereby generating revenue for the Web site. Advertisers have traditionally used visual advertisements, such as banner advertisements, in conjunction with Web sites to help sell their products or services. Such advertisements can, however, either be suppressed or ignored by recipient end-users. Advertisers also include audio advertisements within Web pages. The advertiser must include the audio advertisements within the Web page prior to distributing the Web page to the end-user.

Conventionally, delivery of audio advertisements to end-users is done within Hyper Text Markup Language (HTML) text, the language used to create Web pages at the time of creation. HTML uses a variety of tags or commands that form the content and structure of a Web page. In conventional systems, advertisers insert standard audio tags within the HTML text prior to distribution to a data communications device or a client computer. When a client receives a requested Web page, the client executes the HTML instructions associated with the Web page. When the client computer executes the audio tags within the HTML text, the audio tags instruct the client's Web browser to access the audio content associated with the Web page.

Data, such as HTML text, are delivered over computer and communications networks, such as the Internet, using various data communications protocols. One common protocol in widespread use that provides for a reliable exchange of information between computer systems in such a network is the Transmission Control Protocol or TCP. TCP is a connection oriented protocol that allows two computer systems to each maintain a connection state for a communications session that uses an underlying protocol such as the Internet Protocol (IP) at the network layer to deliver packets between the two computer systems involved in the communications session. The TCP connection state maintained by each computer system supports reliable delivery of the packets by detecting, for example, loss or corruption of a particular packet in the communications session, the arrival of packets out of order from the order in which they were sent from the originating computer system, or the arrival of duplicate packets that might be received by the computer system involved in a TCP communications session.

Each packet transmitted as part of the TCP communications session between the computer systems includes a TCP header portion that identifies, among other things, connection information for that packet. For example, the connection information includes sequence number information that identifies the current byte count of bytes transmitted from a computer system. In another example, the connection information also includes acknowledgment number information that provides an acknowledgment to the other computer system of how many bytes have actually been received by a computer system. Accordingly, a computer system involved in a TCP communications session can use acknowledgment and sequence number information to detect corrupted or lost data in the communications session.

If a computer system involved in a TCP communications session transmits a packet containing a valid TCP header and that packet experiences corruption (e.g., an error or change in the packet information is introduced during its transmission) as it travels through the computer network from the sending computer system to a recipient computer system, the communications session state maintained by the sending and recipient computer systems can be used by TCP to detect this disruption using the connection information. It may be the case, for example, that a noisy transmission link over which the packet traveled on route to the recipient computer system altered one or more bits settings within the packet or introduced additional data into the packet or removed existing data within the packet. As a result, the recipient computer system might detect a checksum error or alternatively, might detect that the sequence number specified in the TCP header for that packet does not properly correspond with the number of bytes received in a packet.

SUMMARY OF THE INVENTION

In conventional data communications systems, in order to distribute audio content within a Web page or content page to an end user, an audio content distributor must include the audio content within the Web page prior to distributing the Web page to the end user. Due to the robustness of connection oriented communications protocols, such as TCP, the conventional modification of the contents of data transmitted through a computer network during a communications session between two computer systems using one of these protocols is not allowed. The difficulty of modifying transmitted data during the transmission process is often cited as a security feature within the TCP protocol, since conventional attempts at modification of packet data for packets transferred using the TCP protocol result in the disruption of sequence and acknowledgment information and error correction or checksum information associated with the connection state of the communications session using the TCP protocol. Therefore, in conventional systems, because any modification to a content page after distribution of the content page from the originating computer system is detected as an error by the receiving computerized device, audio content cannot be inserted into a content page after distribution from a distributing computerized device in conventional technology.

In contrast to conventional distribution of audio content, the present invention is related to techniques that allow insertion of audio tags within a content page during a communications session between a first computerized device and a second computerized device without disruption of the communication session. Such modifications can take place in "mid-stream" during the propagation of the content page through a computer network, such as the Internet, en route to the requesting computerized device.

One embodiment of the invention, in a data communications device, relates to a method for inserting an audio tag into a content page during a communications session between a first computerized device and a second computerized device. The data communications device receives a request for a content page from the first computerized device and transfers the request from the first computerized device to the second computerized device. The method includes the steps of receiving the content page from the second computerized device in response to the request, inserting an audio tag within the content, and adjusting a connection characteristic associated with the content page to maintain the communications session between the first computerized device and the second computerized device. The data communications device then transfers the content page having the audio tag to the first computerized device.

Using this method, the data communications device is able to insert audio content within a content page without disrupting the communication session between the first and second computerized devices.

In another embodiment of the invention, the step of adjusting a connection characteristic can include either adjusting sequence information associated with the content page, adjusting acknowledgement information associated with the content page, adjusting error correction information associated with the content page, or adjusting data size information associated with the content page. By adjusting of any of these types of information, the data communications device maintains the communications session between the first computerized device and the second computerized device after inserting an audio tag within a content page.

In another embodiment, the connection characteristic is associated with a packet containing the content page. For example, during a TCP/IP communication session, data can be transferred between computerized devices in the form of packets. The content page, therefore, be transmitted from the second computerized device as part of a packet or as part of multiple packets.

In another embodiment, the method for inserting an audio tag into a content page further includes receiving a request for audio content from the first computerized device where the request for audio content caused by execution of the audio tag within the content page by the first computer device. The method also includes the data communications device accessing the audio content and distributing the audio content to the first computerized device.

In another embodiment, the method for inserting an audio tag into a content page further includes detecting a criteria of the request for the content page and selecting an audio tag for insertion into the content page based upon the criteria of the request. The data communications device uses the criteria of the request, such as the subject of the requested content page, demographic information of the requesting device, the time or date of the request, the domain of the server, the language of the content page, the meta-data in the content page, or the type of service used for transmission of the request to determine an appropriate audio tag to insert within the content page.

In another embodiment, the method for inserting an audio tag into a content page further includes the data communications device receiving a request for audio content from the first computerized device, detecting the request as execution of an existing audio tag within the content page, and preventing distribution of the requested audio content to the first computerized device. Using this method, in the case where existing audio tags are present within the content page, the data communications device prevents distribution of multiple audio content files (e.g., relating to the inserted audio tag and any preexisting audio tags) to the first computerized device at the same time or within a relatively small time interval.

In another embodiment, the method for inserting an audio tag into a content page further includes the data communications device parsing the content page and selecting an audio tag for insertion within the content page. The step of parsing allows the data communications device to detect a location within the content page to place the audio tag. For example, parsing the content page can provide information as to the location of preexisting audio tags within the content page. The data communications device can the insert the audio tag within the content page such that the audio tag is executed by the first computerized device before the first computerized device executes any preexisting audio tags within the content page.

In another embodiment, the invention relates to a data communications device having at least one communications interface, a processor, a memory, and an interconnection mechanism coupling the at least one communications interface, the memory, and the processor. The processor is configured to receive a request for a content page from the first computerized device, transfer the request for the content page from the first computerized device to the second computerized device. The processor is also configured to receive the content page from the second computerized device in response to the request, insert an audio tag within the content page, adjust a connection characteristic associated with the content page to maintain the communications session between the first computerized device and the second computerized device, and transfer the content page having the audio tag to the first computerized device.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with an insertion manager application that when performed on the processor, produces an insertion manager process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with an insertion manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

The present invention is related to techniques that allow insertion of audio tags within a content page during a communications session between a first computerized device and a second computerized device without disruption of the communication session. Such modifications can take place in "mid-stream" during the propagation of the content page through a computer network, such as the Internet, en route to the requesting computerized device.

Figure 1:
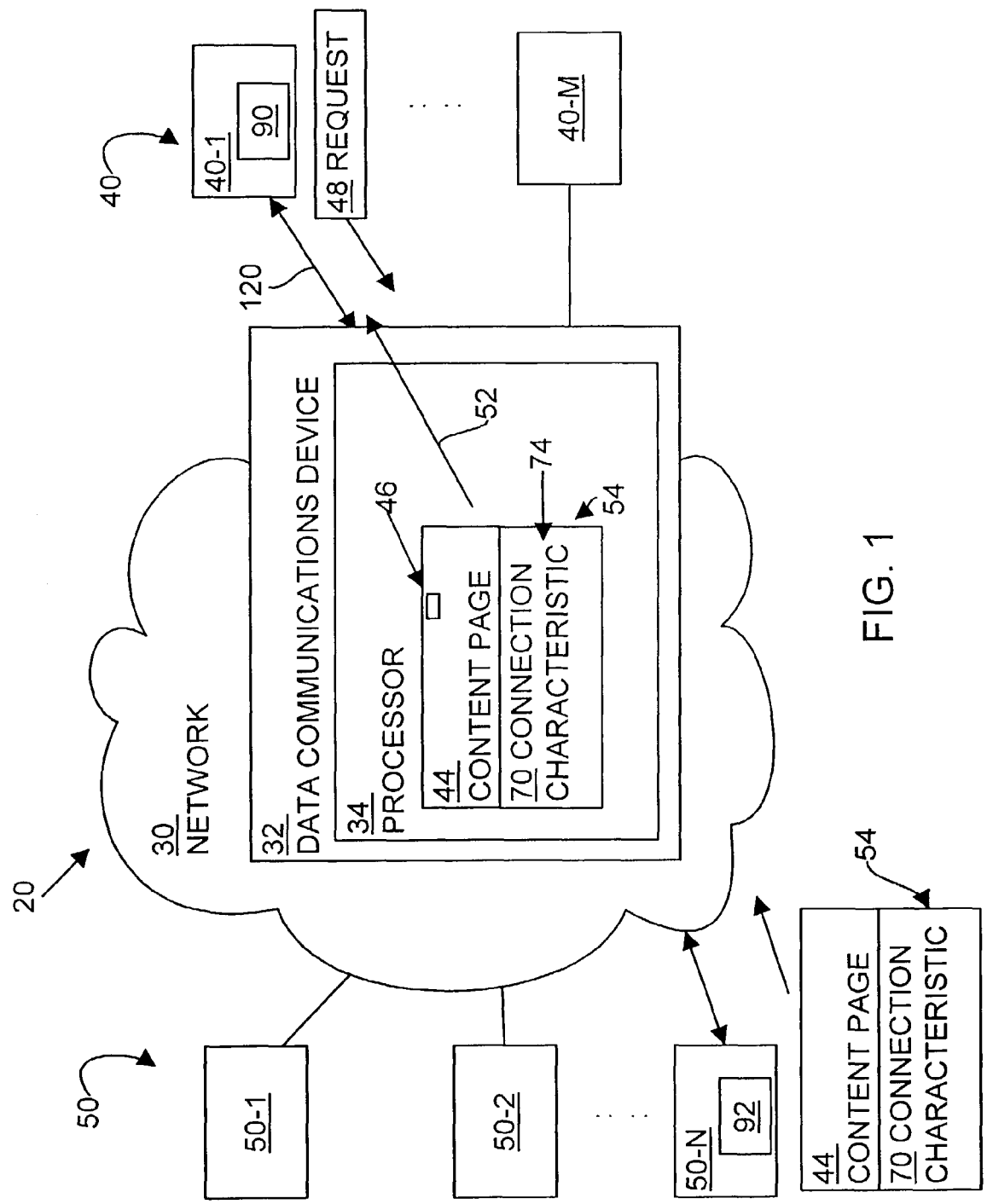
FIG. 1 is a block diagram of a data communications system, configured according to one embodiment of the invention.

FIG. 1 shows a data communications system, given generally as 20, configured to operate according to principles of the present invention. The data communications system 20 includes first computerized devices, such as client computers 40, a data communications device 32 having a processor 34, and second computerized devices, such as server computers 50. The first computerized devices 40 are in communication with the data communications device 32 and, as illustrated, include computers 40-1 through 40-M. The second computerized devices 50 are connected to the data communications device 32 by a network 30, such as the Internet, a local area network, or another type of network. The second computerized devices 50 include computers 50-1 and 50-2 through 50-N.

In a communications session between the client 40-1 and the server 50-N, the client 40-1 includes first connection state information 90 and the server 50-N includes second connection state information 92. The data communications session existing between the client 40-1 and the server 50-N is represented by an arrow 120 and a combination of the first 90 and second 92 connection states maintained by the client 40-1 and server 50-N, respectively.

The data communications device 32 can be, for example, a router, switch, proxy server, network bridge, data repeater, protocol converter, or other type of device that can transmit data between other devices (e.g., clients 40 and servers 50) in the system 20. The data communications device 32 can also be an L7 aware packet-handling device or HTTP-proxy device.

During operation of the data communications system 20 (e.g., during a communications session), as shown in this example, a client 40-1 transmits a data request 48 to a server 50. In this example, the request is an HTTP GET request for a Web page or content page 44 to be served by a server 50. The data communications device 32 intercepts the request 48 from the client 40-1 and transfers the request to the server 50-N.

The server 50-N, in response to the request 48, transmits a content page 44 to the requesting client 40-1. The content page 44 includes associated connection information or connection characteristics 70. In one arrangement, the connection characteristic 70 includes sequence information, acknowledgement information, error correction information, or data size information. Computerized devices, such as the client 40-1 and the server 50-N, involved in a communications session use the connection characteristic 70 to detect corrupted or lost data in the data transmitted between the client 40-1 and server 50-N during a communications session. In one arrangement, the server 50-N transfers the content page 44 and the connection characteristic 70 to the client 40-1 as part of at least one packet 54.

The data communications device 32 intercepts the content page 44 and associated connection characteristic 70 transmitted from the server 50-N. As shown in this example, the processor 34 of the data communications device 32 processes the content page 44 and connection characteristic 70. The processor 34 inserts an audio tag 46 within the content page 44 and adjusts 74 the connection characteristic 70 associated with the content page 44. By adjusting 74 the connection characteristic 70 associated with the content page 44, the data communications device 32 does not disrupt the communications session between the client 40-1 and the server 50-N as caused by insertion of the audio tag 46 within the content page 44. After modifying the content page 44 and the connection characteristic 70, the data communications device transmits 52 the modified content page 44 and the connection characteristic 70 to the client 40-1.

Figure 2:
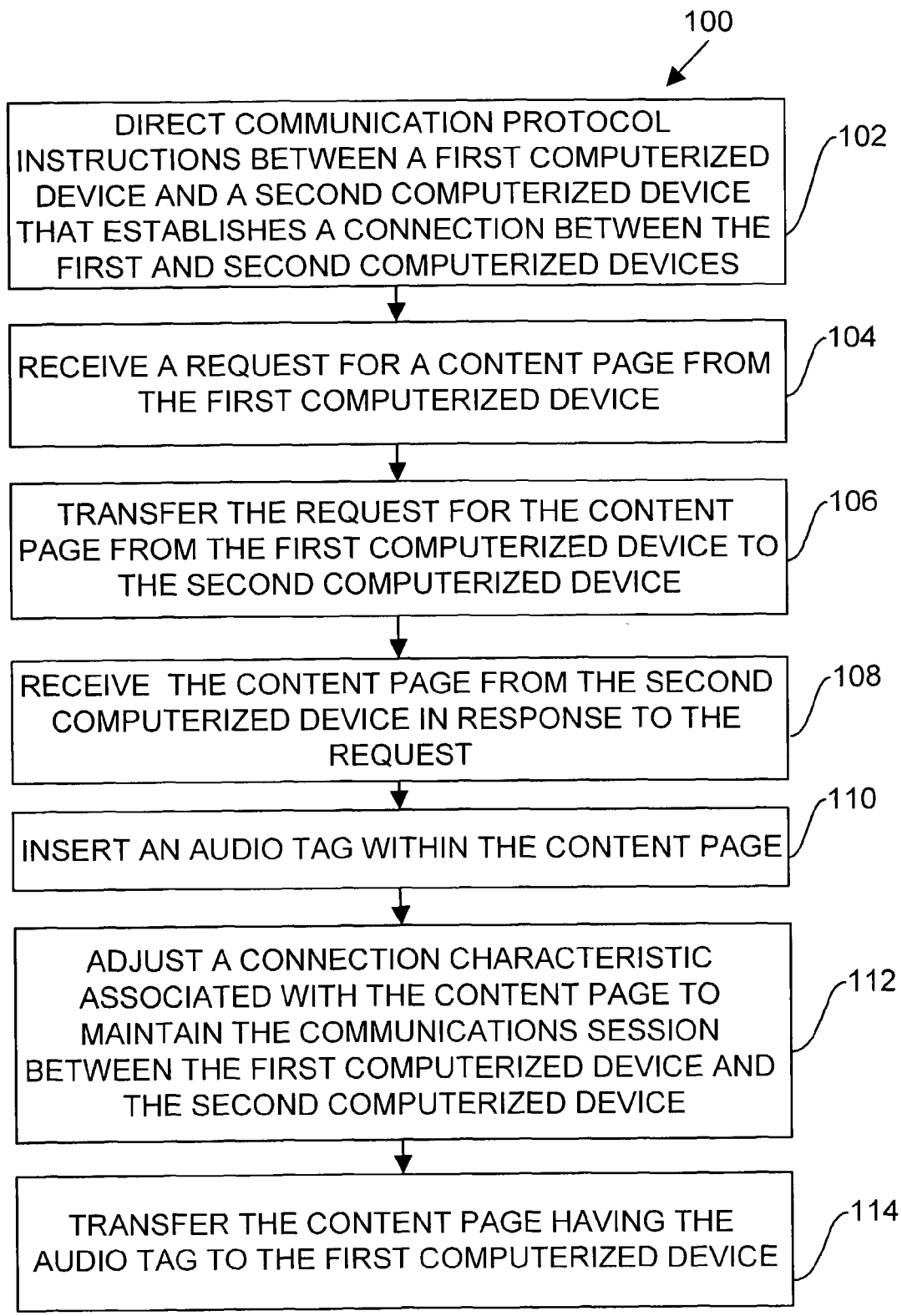
FIG. 2 is a flowchart of a procedure performed by the data communications system of FIG. 1, configured according to one embodiment of the invention.

FIG. 2 illustrates a procedure 100 for inserting an audio tag 46 into a content page 44 during a communications session between a first computerized device 40-1 and a second computerized device 50-N according to one embodiment of the invention.

In step 102, the data communications device 32 directs communications protocol instructions between the first computerized device 40-1 and the second computerized device 50-N, where the exchange of instructions establishes a connection or communications link between the devices 40-1, 50-N. The data communications device 32 ensures that the communications protocol instructions transmitted from the first computerized device 40-1 are forwarded to the appropriate second computerized device 50-N and that the communications protocol instructions transmitted from the second computerized device 50-N are, in turn, forwarded to the requesting first computerized device 40-1. The exchange of communications protocol instructions establishes a communication session between the first computerized device a 40-1 and the second computerized device 50-N. The communications protocol used between the first computerized device 40-1 and the second computerized device 50-N includes Transmission Control Protocol/Internet Protocol (TCP/IP) or File Transfer Protocol (FTP), for example.

In step 104, the data communications device receives a request 48 for a content page 44 from the first computerized device 40-1. In one example, the request 48 is an HTTP GET request for a HyperText Markup Language (HTML) page, or a Web page, to be served by the second computerized device 50-N. Alternately, the first computerized device 40-1 transmits the request using the Common Internet File System (CIFS) protocol, such as used by Internet Protocol telephones, manufactured by Cisco Systems, Inc. of San Jose, Calif.

In step 106, the data communications device 32 transfers the request 48 for the content page 44 from the first computerized device 40-1 to the second computerized device 50-N. In response to the request 48, the second computerized device 50-N transmits the requested content page 44 to the data communications device 32.

In one embodiment, after receiving the request, the second computerized device 50-N transmits the content page 44 to the first computerized device 40-1 as part of at least one packet 54. Each packet 54 transmitted during a communications session between the computerized devices 40-1, 50-N includes a header portion that identifies a connection characteristic 70 for that packet. During a communication session, the first computerized device 40-1 and second computerized device 50-N use the connection characteristic 70 to detect corrupted or lost data transmitted between the devices 40-1, 50-N. As described above, the connection characteristic 70 includes, in one example, sequence information, acknowledgement information, error correction information, or data size information.

Sequence information indicates the number of bytes of data that have been transferred from one computerized device 50-N to another computerized device 40-1. Each byte of data transmitted between computerized devices 40-1, 50-N during a communication session, such as a Transmission Control Protocol (TCP) session, has a unique sequence number. When the second computerized device 50-N places data into a packet 54 to be transmitted during the communications session, the sequence number is updated immediately prior to transmission of that packet 54 to reflect the current total number of bytes of data transmitted from the second computerized device 50-N thus far during the communication session.

Acknowledgment information, in the form of a numerical acknowledgment, allows the first computerized device 40-1 receiving outbound data, such as the content page 44, to acknowledge receipt of a cumulative number of total bytes of data received thus far. Acknowledgment information provides an acknowledgment to the second computerized device 50-N of how many bytes have actually been received thus far by the first computerized device 40-1.

Error correction information, such as a checksum value, is computed based on the entire contents of the packet 54. The first computerized device 40-1 that receives a content page 44 during a communications session can access the checksum value and compare this value with a checksum computed by the first computerized device 40-1 after receipt of the packet 54 to ensure that the packet 54 was properly received. Data size information identifies the amount of data that is contained within a particular packet 54.

In step 108, the data communications device 32 receives the content page 44 and associated connection characteristic 70 from the second computerized device 50-N in response to the request 48. The processor 34 of the data communications device 32 parses the content page 44 and processes the connection characteristic 70 associated with the content page 44.

In step 110, the data communications device 32 inserts an audio tag 46 within the content page 44. The audio tag 46, in one arrangement, is a Web site address or HTTP address, such as a URL. The audio tag 46, in one embodiment, is a link to a Web site that includes audio files for distribution to the first computerized device 40-1. For example, the audio files include .WAV, .SHN, or .MP3 files.

In one embodiment, the audio tag 46 is associated with a Web site containing an audio advertisement file. For example, assume a content publisher, such as a newspaper, has a Web site on the Internet. When an end user, or first computerized device 40-1, accesses the Web site, the data communications device 32 inserts an audio tag 46 into the Web page prior to distributing the page to the end user. This audio tag 46 directs the first computerized device to a Web site having an audio advertisement file for advertisers of the newspaper. In another embodiment, the audio tag is associated with a Web site containing an audio emergency notification file.

In step 112, the data communication device 32 adjusts the connection characteristic 70 associated with the content page 44 to maintain the communications session between the first computerized device 40-1 and the second computerized device 50-N. When inserting an audio tag 46 within the content page 44, the data communication device 32 can disrupt the communications session between the first computerized device 40-1 and the second computerized device 50-N. Disruption can occur because any discrepancy between a connection characteristic 70 associated with the content page 44, transmitted between the first computerized device 40-1 and the second computerized device 50-N during a communications session, and the content page itself indicates to the devices 40-1, 50-N corruption or loss of data within the content page 44 itself. The data communications device 32 modifies the connection information 70 to allow the first 40-1 and second 50-N computer devices to maintain the communications session without disruption caused by the introduction the audio tag 46 into the content page 44.

For example, assume the content page 44 is delivered to the first computerized device 40-1 as a series of packets 54, each packet 54 having an associated connection characteristic 70. In one embodiment, the data communications device 32 modifies the sequence information associated with the content page 44. Because the processor 34 inserts extra data in the form of an audio tag 46 into the content page 44 while on route to the first computerized device 40-1, any subsequent packets 54 sent from the second computerized device 50-N to the first computerized device 40-1 must have their sequence information modified to account for the insertion of the total amount of extra data inserted into all packets 54 transferred up to that point in time.

In another embodiment, after processing the first packet 54 including the audio tag 46, the first computerized device 40-1 transmits a second packet back towards the second computerized device 50-N. The data communications device 32 receives this second packet, containing acknowledgement information for the first packet 54, that acknowledges receipt of the first packet 54 by the first computerized device 40-1 and therefore acknowledges receipt of the audio tag 46 inserted by the processor 34 upon transfer of the first packet 54 to the first computerized device 40-1. The processor 34 adjusts the acknowledgment information in the second packet based upon the data size of the audio tag 46 inserted into the first packet. The data communications device 32 forwards the second packet, including the adjusted acknowledgment information, back to the second computerized device 50-N such that the second computerized device 50-N receives the second packet error-free and without disruption to a communications session state 92 maintained by that device.

In another embodiment, the data communications device 32 adjusts error correction information within the packet 54 to account for changes to the contents of the packet 54 caused by insertion of the audio tag 46. In this manner, upon receipt of the packet 54 by the first computerized device 40-1, the error correction information in the packet 54 will correctly compare with error correction information computed by the first computerized device 40-1 after the packet 54 is received.

In another embodiment, the data communications device 32 adjusts the data size information within the packet 54 to reflect the amount of additional data, in the form of the audio tag 44, inserted within the content page 44. With the data size information modified, upon receipt of the content page 44 with the added audio tag 46, the first computerized device 40-1 determines that the data size information associated with the packet corresponds to the data size of the content page 44 and added audio tag 46. Modification of the data size information, therefore, prevents the first computerized device from detecting the presence of additional data inserted within the content page 44 and maintains the communication session between the first computerized device 40-1 and the second computerized device 50-N.

The use of a data communications device 32 to insert data within a packet and modify connection information 70, such as sequence numbers, acknowledgment numbers, error correction (e.g., checksum), and data size or packet length information is also described in U.S. patent application Ser. No. 10/044,216, the entire contents of which is hereby incorporated by reference.

In step 114, the data communications device 32 transfers the content page 44 having the audio tag 46 and the associated, modified connection characteristic 70 to the first computerized device 40-1. Because the device 32 modified the connection characteristic 70 associated with the content page 44, the communications session between the first computerized device and the second computerized device 50-N is not disrupted by insertion of the audio tag 46 within the content page 44 prior to transmittal to the first computerized device 40-1.

As described above, the data communications device 32 inserts an audio tag 46 within a content page 44 during a communications session between a first computerized device 40-1 and a second computerized device 50-N without disrupting of the communications session between the devices 40-1, 50-N. The second computerized device 50-N transmits a content page 44 to a requesting first computerized device 40-1 and the data communications device 32 intercepts the content page 44 and inserts the audio tag 46 within the content page 44.

Figure 3:
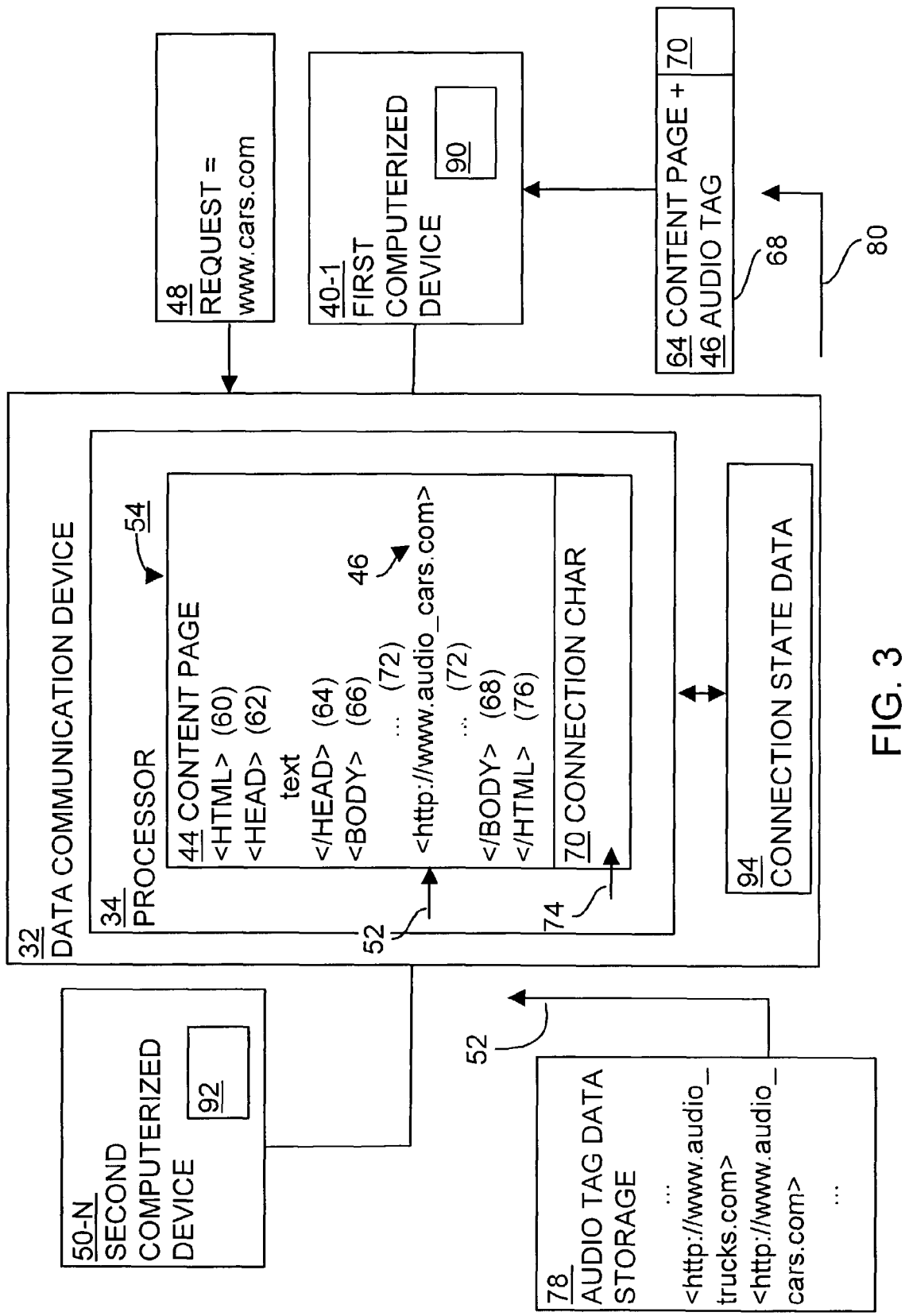
FIG. 3 is a block diagram of the data communications system of FIG. 1, configured according to one embodiment of the invention.

FIG. 3 illustrates an embodiment of the data delivery system 20 inserting the audio tag 46 within the content page 44.

In one embodiment, the content page 44 is a text document. As shown, the content page 44 is an HTML page where HTML is the language used to create Web pages. The data communications device 32, inserts an audio tag 46 within the HTML page. Alternately, the data communications device 32 inserts 52 an audio tag 46 within a Common Internet File System (CIFS) header, such as used by during communication by Internet Protocol telephones. CIFS is a protocol that defines a standard for remote file access using a plurality of computerized devices at a single time. CIFS allows multiple users, having different platforms and computers, to share files. In another embodiment, the data communications device 32 inserts 52 an audio tag 46 within electronic mail (E-mail) messages or other proxy-permitting session-based traffic delivered to the first computerized device 40-1.

After receiving the content page 44, the data communication device 32 parses the content page 44. In parsing the content page 44, the data communications device 32 divides the content page 44 into its components, based upon the presence of certain characters. For example, as shown in FIG. 3, the content page 44 is HTML text. The text is shown parsed into its components or tags. For example, an HTML document starts with the tags <HTML> 60 and <HEAD> 62. The <HTML> tag indicates the beginning of the HTML document and the <HEAD> tag indicates the beginning of a description of the HTML document. A text description of the HTML document is included between the <HEAD> tag 62 and a </HEAD> tag 64 where the </HEAD> tag indicates the end of the text description. The HTML document also includes a <BODY> tag 66 and a </BODY> tag 68. The content 72 that forms a Web page is placed between the <BODY> 66 and </BODY> 68 tags. The HTML document ends with an </HTML> tag 76. In one arrangement, by parsing the content page 44 into its components, the data communications device 32 determines an appropriate location for insertion of the audio tag 46 within the content page 44. For example, the audio tag 46 can be inserted between the <BODY> 66 and </BODY> 68 tags of the content page 44.

Also shown in FIG. 3, the data communications device 32 selects the audio tag 46 and inserts 52 the audio tag 46 within the content page 44. For example, the data communications device 32 communicates with audio tag data storage 78. The audio tag data storage 78 includes a plurality of audio tags 46 from which the data communications device 32 can select an appropriate audio tag 46 for insertion into the content page 44. In one embodiment, selection of an audio tag 46 is based upon a criteria of the request 48 transmitted by the first computerized device 40-1.

Figure 4:
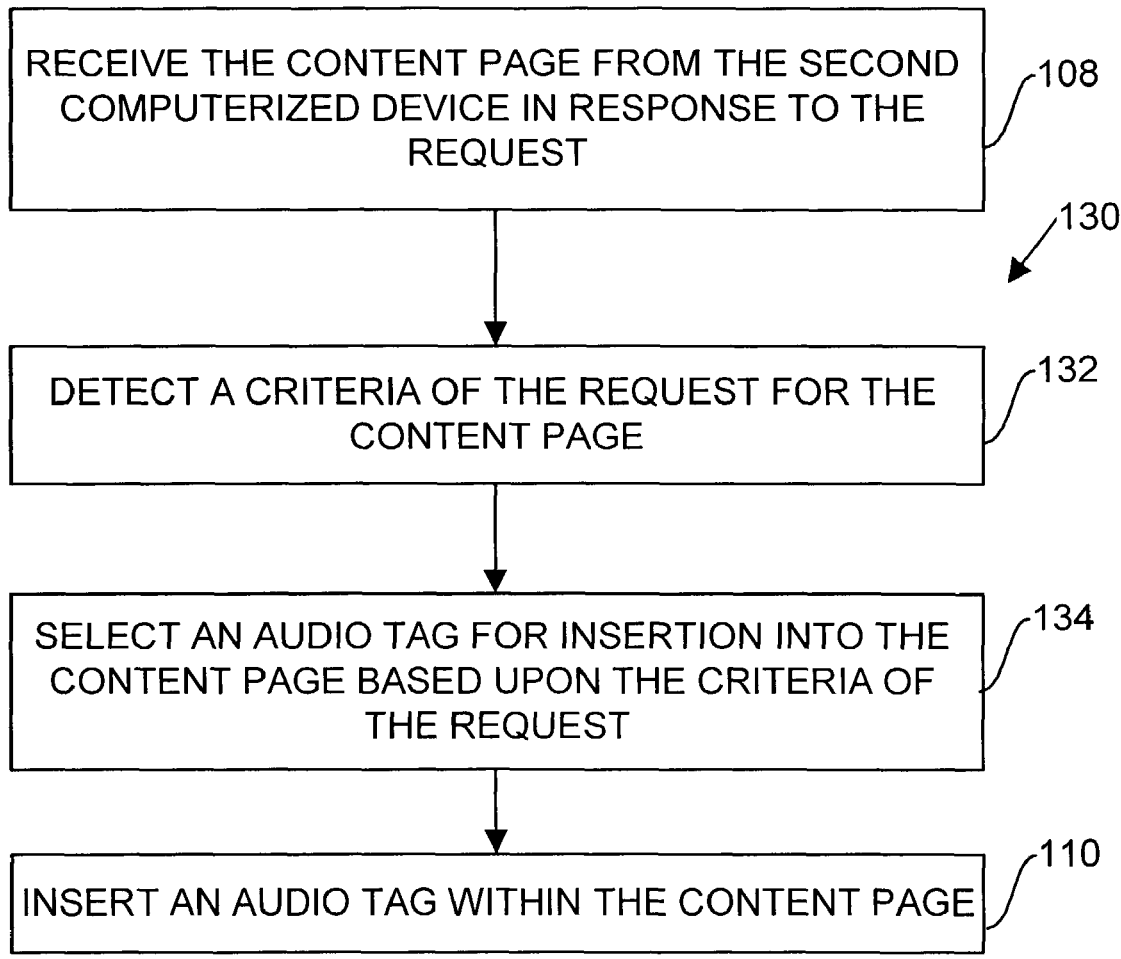
FIG. 4 is a flowchart of a procedure performed by the data communications system of FIG. 1, configured according to one embodiment of the invention.

FIG. 4 illustrates a flowchart of a procedure 130 for selecting an audio tag for insertion into a content page 44, as performed by the data communications device 32.

In step 132, the data communications device 32 detects a criteria of the request for the content page 44. For example, as shown in FIG. 3, assume the request 48 from the client computer 40-1 is a request for "www.cars.com". In one arrangement, the data communications device 32 reviews or parses the request 48 and detects the subject or criteria of the request 48. In this example, the data communications device can detect that the subject of the request 48, "cars", is the criteria of the request 48.

In step 134, the data communications device 32 selects an audio tag for insertion into the content page 44 based, and related to, the criteria of the request 48. As illustrated in this example, because "cars" is the subject of the request 48, the data communications device 32 selects the audio tag <http://www.audio_cars.com> from the audio tag data storage 78. When executed by the first computerized device 40-1, this audio tag 44 links the first computerized 40-1 device to a Web site having audio files related to cars, such as advertisements from automobile manufacturers and sellers.

In step 110, once the data communications device 32 selects the appropriate audio tag 46, the device 32 inserts 52 the tag 46 within the content page 44. The data communications device then transmits 80 the content page 44 and audio tag 46 to the requesting first computerized device 40-1.

Also as illustrated in FIG. 3, the data communication device 32 modifies 74 the connection characteristic 70 associated with the content page 44. The processor 34 has access to connection state data 94 within a storage location, such as a memory. The connection state data 94 generally contains, in a database, file, table, linked list or other suitable data structure entries which track modifications 74 to the connection characteristic 70 (e.g., bytes of data inserted into particular packet, sequence and acknowledgment information for packet 54) for a content page 44 transferred between the first 40-1 and second 50-N computerized devices over the connection session 120.

In the case where the second computerized device 50-N transmits the content page 44 as a series of packets 54, the connection state data 94, in one embodiment of the invention, can contain a finite number of entries, one per packet 54, exchanged over the communications session 120. Each entry represents a packet 54 to which data has been modified, such as a packet 54 in which data has been added or inserted, as previously explained.

For example, the connection state data 94 can contain, for each entry, an original received sequence number and a corresponding acknowledgment number that a recipient computer system of that packet (e.g., one of the first or second computerized devices) is expecting for acknowledgment of reception of the packet corresponding to that entry (such an acknowledgement forthcoming in a subsequent packet). The entry for a particular packet within the connection state data 187 can also contain, in one embodiment of the invention, a new sequence number expected by the computerized device which is to receive the modified packet. This new sequence number is the original sequence number of the entry for this packet in combination with (i.e., in addition to) the total number of bytes of data inserted or added to all packets in the TCP session since the initial establishment of the commutation session 120 (e.g., since the reception of the TCP synchronize packet). In addition, the connection state data 94 can contain an entry indicating how many bytes of data had be inserted into this particular packet.

In the case where the first computerized device 40-1 requests a content page 44, such as an HTML page, the first computerized device 40-1 receives the content page 44 and executes the instructions or HTML text of the content page 44 using a software or computer program, such as a Web browser. When the first computerized device 40-1 executes the audio tag 46 inserted within the content page 44, the device 40-1 transmits a request to the data communications device 32 for access to the audio file associated with the audio tag 46.

Figure 5:
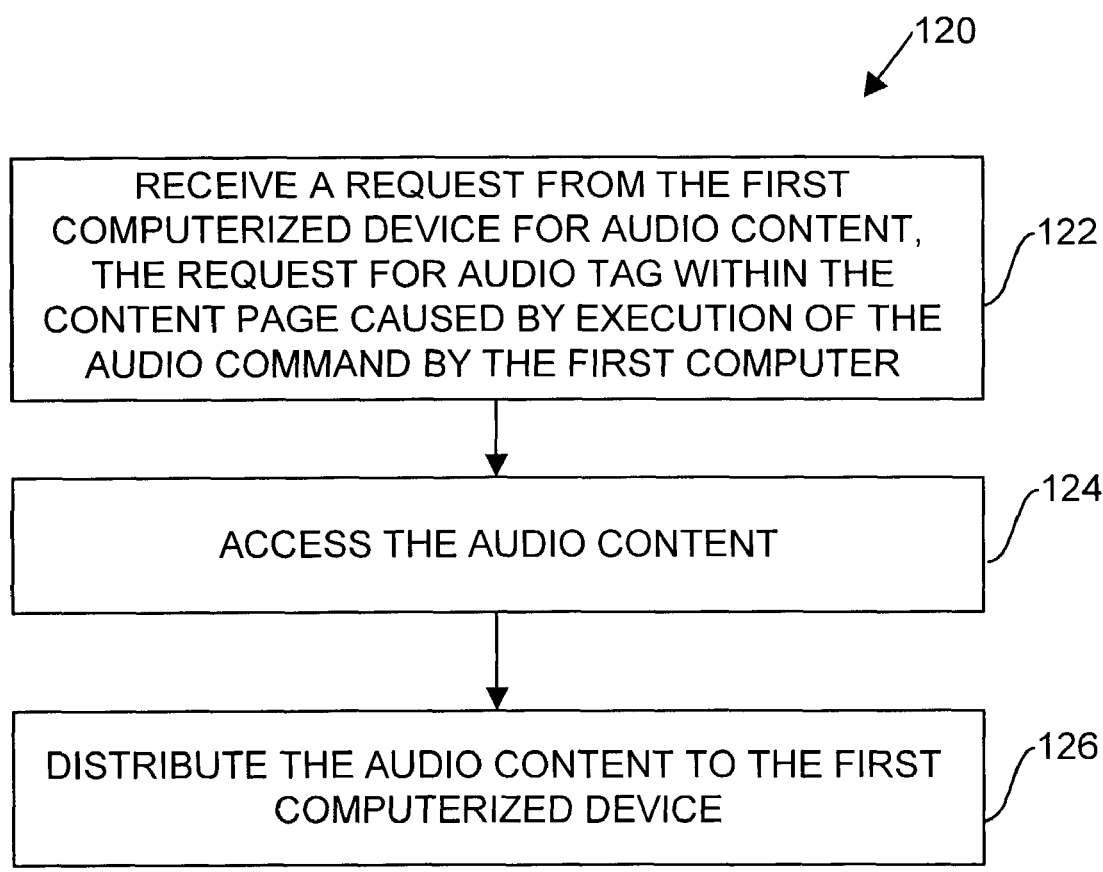
FIG. 5 is a flowchart of a procedure performed by the data communications system of FIG. 1 configured according to one embodiment of the invention.

FIG. 5 illustrates a flowchart of a procedure 120 for distributing audio to a first computerized device 40-1, as performed by the data communications device 32.

In step 122, the data communications device 32 receives a request for audio content from the first computerized device 40-1. As described, the first computerized device 40-1 requests audio content by executing the audio tag 46 within the content page 44. For example, the audio tag 46 is a link to a Web site that includes audio content. Execution of the audio tag 46 causes the first computerized device 40-1 to transmit a request to the data communications device 32 for the audio content associated with the Web site.

In step 124, the data communication device 32 accesses the audio content requested by the first computerized device 40-1. In one embodiment, the step of accessing the audio content includes the data communications device 32 communicating with a second computerized device 50 that contains the requested audio content and receiving the audio content from the second computerized device 50.

In step 126, the data communication device 32 distributes the requested audio content to the first computerized device 40-1. The end user of the first computerized device 40-1 hears the audio content while viewing the requested Web page. The first computerized device 40-1 receives the audio content in the form of an audio advertisement, in one embodiment.

As described above, when the first computerized device 40-1 executes the audio tag 46 inserted within the content page 44 by the data communications device 32, the first computerized device 40-1 transmits a request to the data communications device 32 for the audio content associated with the audio tag 46. However, additional, previously existing audio tags can be located within the content page 44 transmitted to the device 40-1. In one embodiment, the data communications device 32 is configured to prevent the distribution of audio content associated with the previously existing audio tags within the content page 44.

Figure 6:
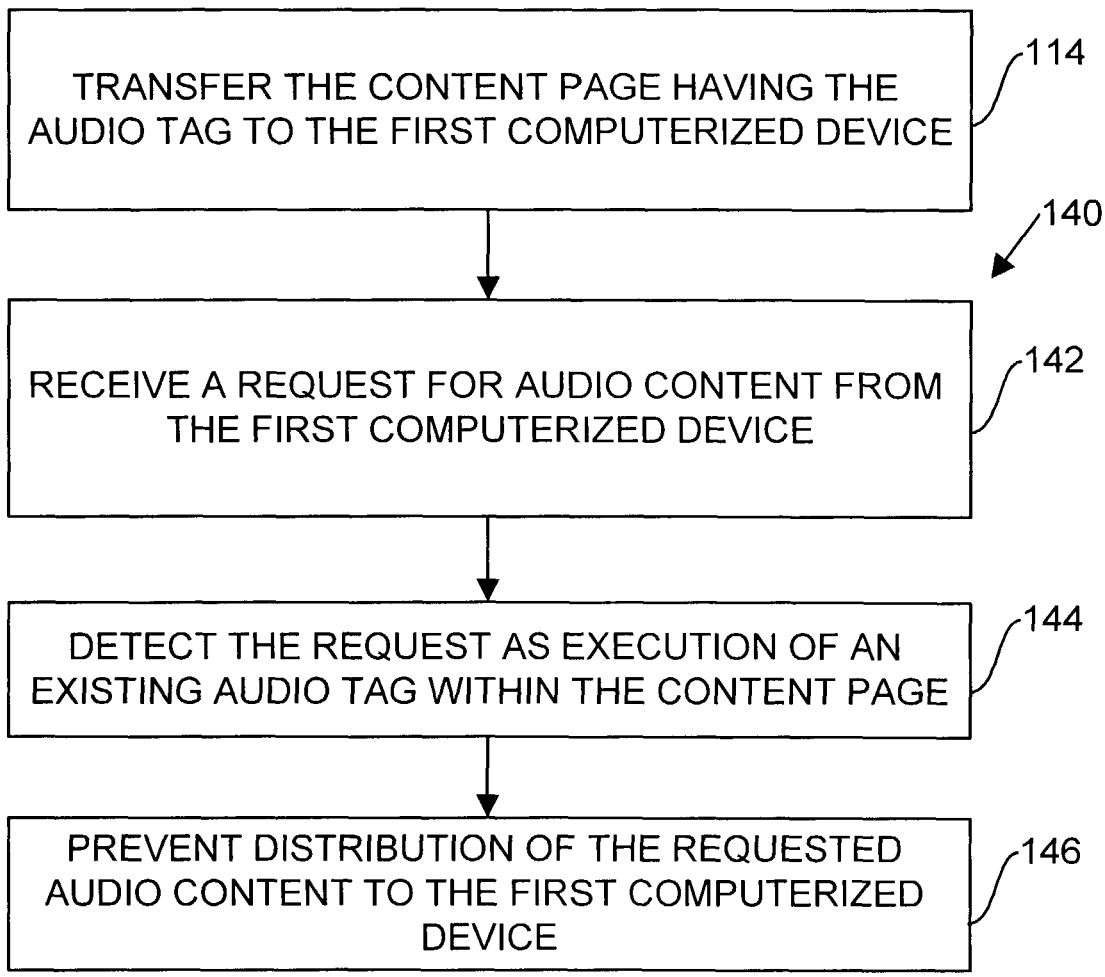
FIG. 6 is a flowchart of a procedure performed by the data communications system of FIG. 1 configured according to one embodiment of the invention.

FIG. 6 shows a flowchart of a procedure 140 for preventing distribution of audio content to a first computerized device 40-1, as performed by the data communications device 32.

In step 114, as previously illustrated in FIG. 2, the data communications device 32 transfers the content page 44 having the inserted audio tag 46 and modified connection characteristic 70 to the first computerized device 40-1. As stated, additional, previously existing audio tags can be located within the content page 44 transmitted to the device 40-1.

In step 142, the data communications device 32 receives a request for audio content from the first computerized device 40-1. This occurs after the first computerized device 40-1 executes the instructions or tags within the content page 44. In this example, the first computerized device 40-1 generates a request for audio content either by execution of the inserted audio tag 46 or by execution of a previously existing audio tag within the content page 44.

In step 144, the data communications device 32 detects the request for as execution of an existing audio tag within the content page 44, as opposed to execution of the inserted audio tag 46. In one embodiment, the data communications device 32 detects that the request for audio content is caused by execution of an existing audio tag within the content page 44 based upon the number of audio requests that the data communications device 32 receives from the first computerized device 40-1. For example, when the data communications device 32 inserts the audio tag 46 within the content page received from the second computerized device 50-N, the device 32 can place the audio tag 46 within the content page 44 such that the first computerized device 40-1 executes the inserted audio tag 46 before executing any existing audio tags located within the content page 44. As the first computerized device 40-1 executes the instructions or tags within the content page 44, the data communications device 32 can receive multiple content requests associated with the tags. In one embodiment, the data communications device 32 tracks the number of requests for audio content. In this example, the first request for audio content received by the data communications device 32, therefore, is made in response to the inserted audio tag 46. When the data communications device 32 receives more than one request for audio content from the first computerized device 40-1, the device 32 detects that the additional audio content requests are caused by execution of preexisting audio tags located within the content page 44.

In step 146, the data communications device 32 prevents distribution of the requested audio content to the first computerized device 40-1. In one embodiment, the data communications device 32 performs this step by receiving the audio content request from the first computerized device 40-1 and not transmitting the request to a second computerized device 50. In another embodiment, the data communications device 32 performs this step by transmitting the audio content request to an appropriate second computerized device 50, receiving the audio content from the second computerized device 50, and withholding the audio content from the first computerized device 40-1.

Figure 7:
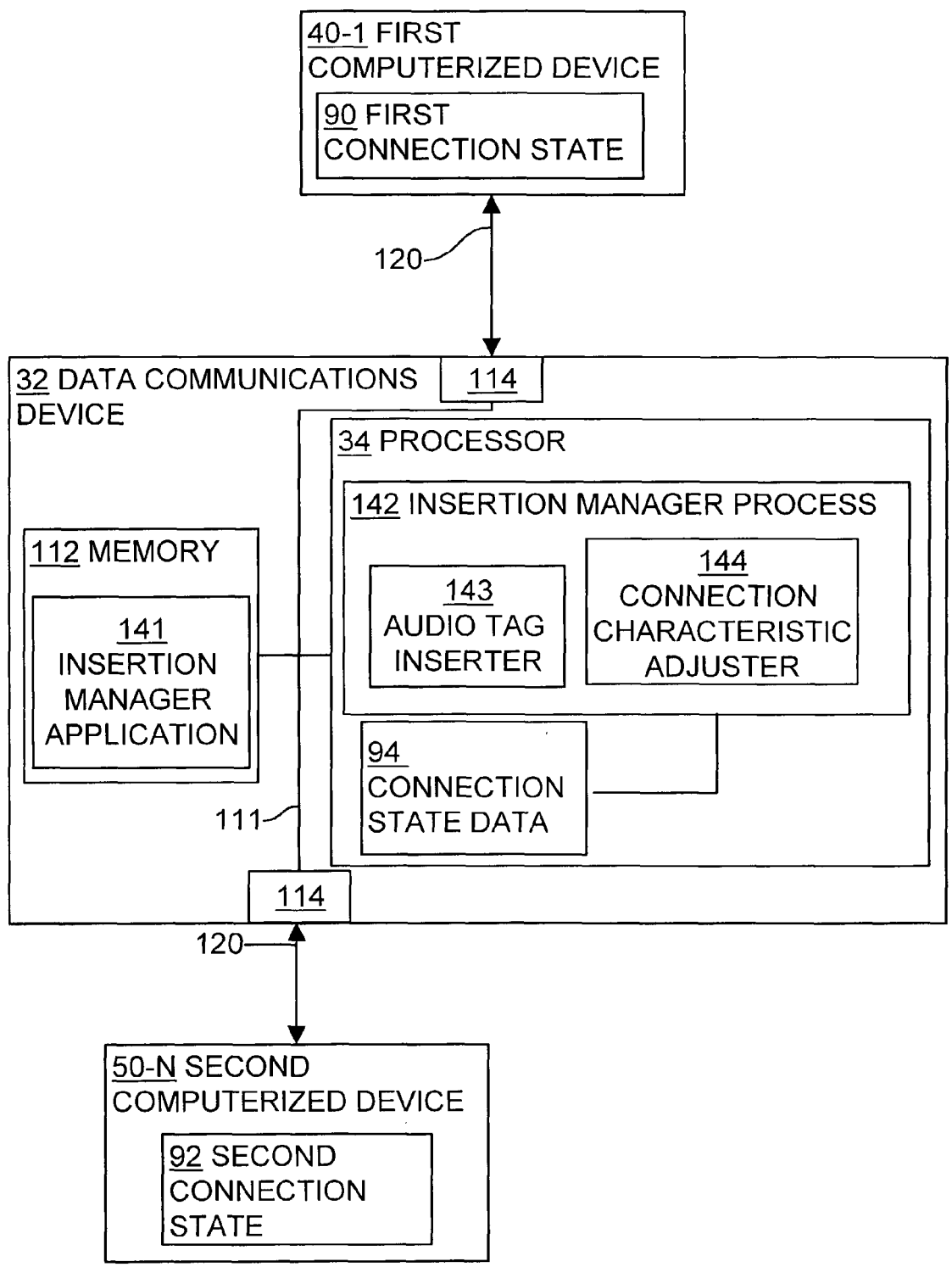
FIG. 7 is a block diagram of a communications device according to one embodiment of the invention.

FIG. 7 illustrates a more detailed architecture of a data communications device 32 configured according to one embodiment of the invention and also illustrates more details concerning the first computerized device 40-1 and the second computerized device 50-N. In particular, the first computerized device 40-1 includes first connection state information 90 and the second computerized device 50-N includes second connection state information 92. The data communications session existing between the first computerized device 40-1 and the second computerized device 50-N is represented by the arrow 120 and a combination of the first 90 and second 92 connection states maintained by the first 40-1 and second 50-N computerized devices, respectively. In addition, connection state data 94 maintained within the data communications device 32, as will be explained, reflects connection information used for the insertion of data not originated from either the first 40-1 or second 50-N computerized device into the data communications session 195. It is to be understood that the data communications session 195 passes through the data communications device 32 and serves as a transport mechanism (e.g., a TCP/IP communications session) for messages, which may be packets of data (e.g., IP packets) containing information or data formatted according to an application level protocol, such as HTTP, that is exchanged between the first computerized device 40-1 and the second computerized device 50-N.

The data communications device 32, in this example embodiment of the invention, includes an interconnection mechanism 111 such as a data bus and/or other circuitry that interconnects a memory 112, a processor 34 and one or more communications interfaces 114.

The memory 112 can be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 112 is encoded with logic instructions (e.g., software code) and/or data that form an insertion manager application 141 configured according to embodiments of the invention. In other words, the insertion manager application 141 represents software code, instructions and/or data that represent or convey the processing logic steps and operations as explained herein and that reside within memory or storage or within any computer readable medium accessible to the data communications device 32.

The processor 34 represents any type of circuitry or processing device such as a central processing unit, microprocessor or application-specific integrated circuit that can access the insertion manager application 141 encoded within the memory 112 over the interconnection mechanism 111 in order to execute, run, interpret, operate or otherwise perform the insertion manager application 141 logic instructions. Doing so forms the insertion manager process 142. In other words, the insertion manager process 142 represents one or more portions of the logic instructions of the insertion manager application 141 while being executed or otherwise performed on, by, or in the processor 34 within the data communications device 32.

The insertion manager process 142 includes an audio tag inserter 143 and a connection characteristic adjuster 144. Generally, the audio tag inserter 143 is activated upon detection of a content page 44 in which an audio tag 46 is to be inserted. The connection characteristic adjuster 144 operates to manipulate or otherwise adjust a content characteristic, such as sequence and/or acknowledgment information as well as error correction and packet length information, associated with the content page, such as located within an HTTP header of a packet being exchanged between the first and second computerized devices 40-1 and 50-N, respectively. The insertion manager process 142 maintained and has access to connection state data 94 which generally contains, in a database, file, table, linked list or other suitable data structure entries which track packet modifications (e.g., bytes of data inserted into particular packet) and sequence and acknowledgment information for packet being transferred between the first 40-1 and second 50-N computerized devices over the connection session 120.

Using the information in the connection state data 94, the insertion manager process 142 is able to insert audio tags into content pages 44 traveling between the first computerized device 40-1 and the second computerized device 50-N and is able to properly adjust the connection characteristics 70, such as sequence number and acknowledgment information, associated with those content pages 44 in order to make the recipient computerized device receiving the content page 44 (i.e., the first computerized device 40-1) correctly and non-disruptively maintained respective connection state information 90, 92 even though the insertion manager process 142 is able to insert additional data into such content pages 44.

While this invention has been particularly shown and described with references to preferred embodiments thereof, it will be understood by those skilled in the art that various changes in form and details may be made therein without departing from the spirit and scope of the invention as defined by the appended claims.

For example, as described, the first computerized device 40-1 requests audio content by executing the audio tag 46 within the content page 44. The data communications device 32 receives the request for audio content from the first computerized device 40-1, accesses the audio content requested by the first computerized device 40-1, and distributes the requested audio content to the first computerized device 40-1. The first computerized device 40-1, however, can transmit an audio content request to the data communications device 32 where the audio content request does not specify a particular audio format for the content.

In one embodiment, the data communications device 32 detects the audio formats for the audio content requests transmitted by the first computerized device 40-1 over a period of time. The data communications device 32 stores the format of each audio content request as format information within a storage location, such as a caching table. Assume the data communications device 32 receives an audio content request from the first computerized device 40-1 that does not specify an audio format. The data communications device 32 then utilizes the format information within the storage location to select an appropriate audio format (e.g., .WAV, .SHN, .MP3) for the audio content, when multiple formats are available for a particular audio tag to be inserted.

For example, assume the first computerized device 40-1 has transmitted several different requests for audio content to the data communications device 32 over a period of time where each audio content request is a request for audio content having an .MP3 format. Also, assume that the first computerized device 40-1 transmits a subsequent audio content request that does not specify a particular audio format. Also assume that the if an audio content request does not specify a particular audio format, the data communications device 32 can select the format of the requested audio content from one of several audio content formats. In this example, therefore, the data communications device 32 retrieves the format information from the storage location, determines the most common audio format transmitted to the first computerized device 40-1 (e.g., .MP3 format), and select the format of the requested audio content as the most commonly requested audio format by the first computerized device 40-1.

As described above, the data communications device 32 modifies the content page 44 requested by the first computerized device 40-1 to include an audio tag 46. When the first computerized device 40-1 executes the audio tag 46, the first computerized device 40-1 transmits a request 48 for audio content to the data communications device 32. The data communications device 32, in turn, transmits the requested audio content to the first computerized device 40-1. In an alternate embodiment, the data communications device 32 does not modify the content page 44 transmitted to the first computerized device 40-1 to include an audio tag, but instead, transmits audio content to the first computerized device 40-1 based upon the first computerized device 40-1 executing an existing audio tag within the requested content page 44.

In one embodiment, the data communications device 32 transmits a requested content page 44, having an existing audio tag within the content page 44, to the first computerized device 40-1. The data communications device 32 detects execution of the existing audio tag by the first computerized device 40-1 and intercepts the resulting audio content request. The data communications device 32, based upon the interception, can then select a substitute audio content for transmission in place of the requested audio content. In one embodiment, the data communications device 32 utilizes format information within the storage location, as described above, to select an appropriate audio format (e.g., .WAV, .SHN, .MP3) for the audio content. After selecting the substitute audio content, the data communications device 32 can either transmit the substitute audio content to the first computerized device 40-1 or can transmit both the substitute audio content and the requested audio content to the first computerized device 40-1.

As described above, when the data communications device 32 inserts audio tags 46 within the content page 44, the device 32 modifies a connection characteristic 70 within the header portion of the packets that form the content page 44. Also as described above, the data communications device 32 modifies the connection characteristic 70 within the header portion of the packets that acknowledge receipt of the packets that form the content page 44. The data communications device 32 tracks the state information of the server 50-N and client 40-1 and alters the connection characteristic 70 of the packet headers transmitted between the client 40-1 and server 50-N to allow data (e.g., audio tags) the connection in either direction. Therefore, all packets transmitted between the server 50-N and client 40-1 must travel through the modifying device (e.g., data communications device 32).

In an alternate embodiment, the data communications device 32 does not alter the total byte count of the packets transmitted between the server 50-N and client 40-1, and therefore, does not alter the connection characteristic 70 of the packet headers. The data communications device 32 can insert or replace audio tags within a content page 44 transmitted to a client 40-1 by overwriting pre-existing audio tags within the content page 44. The data communications device 32 can also insert data (e.g. audio tags) within a request (e.g., packet) transmitted from a client 40-1 to a server 50-N by overwriting some pre-existing, and non-critical, data in the request 48. In this embodiment, the data communications device 32 modifies requests 48 for content from the client 40-1 to the server 50-N at the application level of the packet and does not modify the connection characteristic 70 of the packet.

For example, assume a client 40-1 requests a file having an .ASX format (e.g., a multi-media playlist protocol for Windows Media Technologies) or having an .M3U file format (e.g., an MP3 playlist protocol for Winamp). Also assume the data communications device 32 is configured to detect a request for these file formats from the client. When the data communications device 32 detects a request for a file having an .ASX format, the data communications device 32 overwrites non-critical data within the request with data requesting an additional file having an .ASX format (e.g., such as an advertisement). When a server transmits a response to the request, the client 40-1 receives the file requested by the client 40-1 and the file requested by the data communications device 32. The data communications device 32 does not modify the total byte count of the request 48 from the client 40-1.

In this embodiment, data communications device 32 intercepts only outgoing requests 48 or packets from the client 40-1. The return (e.g., content page 44) packets from the server 50-N can be redirected to the data communications device 32 for transmission to the client 40-1 or, because the state information between the client 40-1 and server 50-N is unmodified, can bypass the data communications device 32. When high-bandwidth applications are used within a data communications system 20, such bypassing limits the packets transmitted from the server 50-N to the client 40-1 from monopolizing the computational resources of the data communications device 32.

As described above, the data communications device 32 modifies the content page 44 requested by the first computerized device 40-1 to include an audio tag 46. In one embodiment, the data communications device 32 inserts a tag 46 such as "scriplet" or applet tag within the content page 44. For example, an applet tag is a program that is executed within an existing application. When the client 40-1 executes the applet tag, the applet tag causes the client 40-1 to execute a series of instructions that causes the client 40-1 to retrieve audio content and produce an audio result as described above.

In another embodiment, the data communications device 32 inserts a tag, such as a video tag within a content page 44 received from a server 50-N, and modifies the connection characteristic 70 associated with the content page 44. For example, execution of the video tag 46 by the client 40-1 causes the data communications device to transmit a semi-transparent video to the client 40-1 that is played in the background of a content page 44 requested by the client 40-1. In another example, execution of the video tag 46 by the client 40-1 causes the data communications device 32 to transmit or a live video element in the background imagery of a computer game received by the client 40-1.

Such variations are intended to be covered by the scope of this invention. As such, the foregoing description of embodiments of the invention is not intended to be limiting. Rather, any limitations to the invention are presented in the following claims.

What is claimed is:

1. In a data communications device, a method for inserting an audio tag into a content page during a communications session between a first computerized device and a second computerized device, the method comprising:
   receiving a request for a content page from the first computerized device;

transferring the request for the content page from the first computerized device to the second computerized device;

receiving the content page from the second computerized device in response to the transferred request;

inserting an audio tag within the content page;

upon inserting the audio tag within the content page, adjusting a connection characteristic in a header portion of a packet associated with the content page to maintain the communications session between the first computerized device and the second computerized device, wherein the connection characteristic in the header portion of the packet is adapted for detecting at least one of corrupted and lost data transmitted between the first computerized device and the second computerized device, and wherein adjusting the connection characteristic comprises at least one of:

adjusting sequence information associated with the content page;

adjusting acknowledgement information associated with the content page;

adjusting error correction information associated with the content page; and adjusting data size information associated with the content page;

and transferring the content page having the audio tag to the first computerized device.

2. The method of claim 1 further comprising:

receiving a request for audio content from the first computerized device, the request for audio content caused by execution of the audio tag within the content page by the first computer device;

accessing the audio content; and distributing the audio content to the first computerized device.

3. The method of claim 1 further comprising:

detecting a criteria of the request for the content page; and selecting an audio tag for insertion into the content page based upon the criteria of the request.

4. The method of claim 1 further comprising:

receiving a request for audio content from the first computerized device;

detecting the request as execution of an existing audio tag within the content page; and preventing distribution of the requested audio content to the first computerized device.

5. The method of claim 1 further comprising:

parsing the content page; and selecting an audio tag for insertion within the content page.

6. The method of claim 5 wherein parsing comprises:

parsing the content page into its component parts;

and wherein selecting comprises:

selecting an audio tag for insertion within the content page, wherein the audio tag selected for insertion within the content page corresponds to content within one of the component parts of the content page.

7. The method of claim 1 wherein inserting an audio tag comprises inserting an audio tag within a Hyper Text Markup Language page.

8. The method of claim 1 wherein inserting an audio tag comprises inserting an audio tag within a Common Internet File System header.

9. The method of claim 1 wherein inserting comprises:

inserting an audio tag within the content page, wherein the audio tag comprises an address for a website that includes one or more audio data files for distribution to the first computerized device.

10. The method of claim 1 wherein inserting comprises:

inserting an audio tag within the content page, wherein the audio tag comprises a link to a website that includes one or more audio data files for distribution to the first computerized device.

11. A data communications device comprising:

at least one communications interface;

a processor;

a memory; and an interconnection mechanism coupling the at least one communications interface, the memory, and the processor;

wherein the processor is configured to:

receive a request for a content page from the first computerized device;

transfer the request for the content page from the first computerized device to the second computerized device;

receive the content page from the second computerized device in response to the request;

insert an audio tag within the content page;

upon inserting the audio tag within the content page, adjusting a connection characteristic in a header portion of a packet associated with the content page to maintain the communications session between the first computerized device and the second computerized device, wherein the connection characteristic in the header portion of the packet is used for detecting at least one of corrupted or lost data transmitted between the first computerized device and the second computerized device, and wherein adjusting the connection characteristic comprises at least one of:

adjusting sequence information associated with the content page;

adjusting acknowledgement information associated with the content page;

adjusting error correction information associated with the content page;

and adjusting data size information associated with the content page;

and transfer the content page having the audio tag to the first computerized device.

12. The data communications device of claim 11 wherein the processor is further configured to:

receive a request for audio content from the first computerized device, the request for audio content caused by execution of the audio tag within the content page by the first computer device;

access the audio content; and distribute the audio content to the first computerized device.

13. The data communications device of claim 11 wherein the processor is further configured to:

detect a criteria of the request for the content page; and select an audio tag for insertion into the content page based upon the criteria of the request.

14. The data communications device of claim 11 wherein the processor is further configured to:

receive a request for audio content from the first computerized device;

detect the request as execution of an existing audio tag within the content page; and prevent distribution of the requested audio content to the first computerized device.

15. The data communications device of claim 11 wherein, when receiving, the processor is further configured to:
   parse the content page; and
   select an audio tag for insertion within the content page.

16. The data communications device of claim 11 wherein, when inserting, the processor is further configured to of insert an audio tag within a Hyper Text Markup Language page.

17. The data communications device of claim 11 wherein, when inserting, the processor is further configured to insert an audio tag within a Common Internet File System header.

18. A computer program product having a non-transitory computer-readable medium including computer program logic stored thereon that, when performed on a computer, causes the computer to:
   receive a request for a content page from the first computerized device;
   transfer the request for the content page from the first computerized device to the second computerized device;
   receive the content page from the second computerized device in response to the request;
   insert an audio tag within the content page;
      upon inserting the audio tag within the content page, adjusting a connection characteristic in a header portion of a packet associated with the content page to maintain the communications session between the first computerized device and the second computerized device, wherein the connection characteristic in the header portion of the packet is used for detecting at least one of corrupted or lost data transmitted between the first computerized device and the second computerized device, and wherein adjusting the connection characteristic comprises at least one of:
         adjusting sequence information associated with the content page;
         adjusting acknowledgement information associated with the content page;
         adjusting error correction information associated with the content page;
         and
         adjusting data size information associated with the content page;
      and
   transfer the content page having the audio tag to the first computerized device.

19. A data communications device comprising:
   at least one communications interface;
   a processor;
   a memory; and
   an interconnection mechanism coupling the at least one communications interface, the memory, and the processor;
   wherein the processor includes:
      means for receiving a request for a content page from the first computerized device;
      means for transferring the request for the content page from the first computerized device to the second computerized device;
      means for receiving the content page from the second computerized device in response to the request;
      means for inserting an audio tag within the content page;
      means for adjusting, upon inserting the audio tag within the content page, a connection characteristic in a header portion of a packet associated with the content page to maintain the communications session between the first computerized device and the second computerized device, wherein the connection characteristic in the header portion of the packet is used for detecting at least one of corrupted or lost data transmitted between the first computerized device and the second computerized device, and wherein the means for adjusting the connection characteristic comprises at least one of:
         means for adjusting sequence information associated with the content page;
         means for adjusting acknowledgement information associated with the content page;
         means for adjusting error correction information associated with the content page; and
         means for adjusting data size information associated with the content page;
      and
      means for transferring the content page having the audio tag to the first computerized device.

20. In a data communications device, a method for inserting an audio tag into a content page during a communications session between a first computerized device and a second computerized device, the method comprising the steps of:
   receiving a request for a content page from the first computerized device;
   transferring the request for the content page from the first computerized device to the second computerized device;
   receiving the content page from the second computerized device in response to the request;
   inserting an audio tag within the content page, comprising inserting at least one of an applet tag and a video tag within the content page;
   upon inserting the audio tag within the content page, adjusting a connection characteristic in a header portion of a packet associated with the content page to maintain the communications session between the first computerized device and the second computerized device, wherein the connection characteristic in the header portion of the packet is used for detecting at least one of corrupted or lost data transmitted between the first computerized device and the second computerized device, and wherein adjusting the connection characteristic comprises at least one of:
      adjusting sequence information associated with the content page;
      adjusting acknowledgement information associated with the content page;
      adjusting error correction information associated with the content page; and
      adjusting data size information associated with the content page;
   and
   transferring the content page having the audio tag to the first computerized device.

21. A data communications device comprising:
   at least one communications interface;
   a processor;
   a memory; and
   an interconnection mechanism coupling the at least one communications interface, the memory, and the processor;
   wherein the processor is configured to:
      receive a request for a content page from the first computerized device;
      transfer the request for the content page from the first computerized device to the second computerized device;

receive the content page from the second computerized device in response to the request;

insert a tag within the content page, wherein at least one of an applet tag and a video tag is inserted within the content page;

upon inserting the tag within the content page, adjusting a connection characteristic in a header portion of a packet associated with the content page to maintain the communications session between the first computerized device and the second computerized device, wherein the connection characteristic in the header portion of the packet is used for detecting at least one of corrupted or lost data transmitted between the first computerized device and the second computerized device, and wherein adjusting the connection characteristic comprises at least one of:

adjusting sequence information associated with the content page;

adjusting acknowledgement information associated with the content page;

adjusting error correction information associated with the content page;

and adjusting data size information associated with the content page;

and transfer the content page having the tag to the first computerized device.

\* \* \* \* \*